Inventor
Gordon King

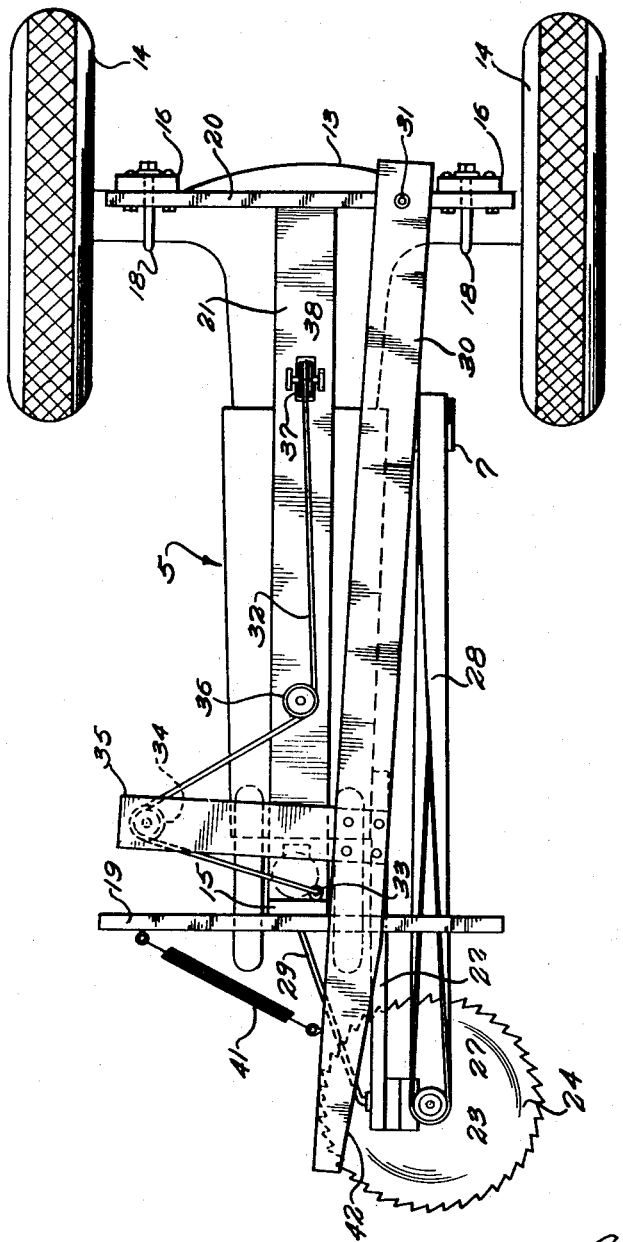

Patented Sept. 2, 1947

2,426,694

UNITED STATES PATENT OFFICE 2,426,694

TRACTOR-MOUNTED CIRCULAR-SAW TREE-FELLING MACHINE WITH A LATERALLY-ACTING TREE PUSHER

Gordon King, Lewiston, Mich.

Application December 18, 1945, Serial No. 635,653

3 Claims. (Cl. 143—43)

This invention relates to improvements in tree felling machines of the type embodying a motor vehicle equipped with a circular saw adapted to be fed to the work by forward movement of the vehicle.

An object of the present invention is to provide a machine of the above kind which is comparatively simple and durable in construction, easy to operate, and highly efficient in operation.

A further object of the invention is to provide improved means whereby a conventional agricultural tractor may be readily converted into a tree felling machine.

Another, more specific, object of the invention is to provide simple and efficient means under control of the driver of the tractor or motor vehicle for causing the tree to fall laterally of and out of the path of the tractor or vehicle when said tree is felled by use of the saw.

The exact nature of the present invention, as well as more specific objects and features thereof, will become apparent from the following description when considered in connection with the accompanying drawings, in which:

Figure 3 is a top plan view of the same.

Figure 1:
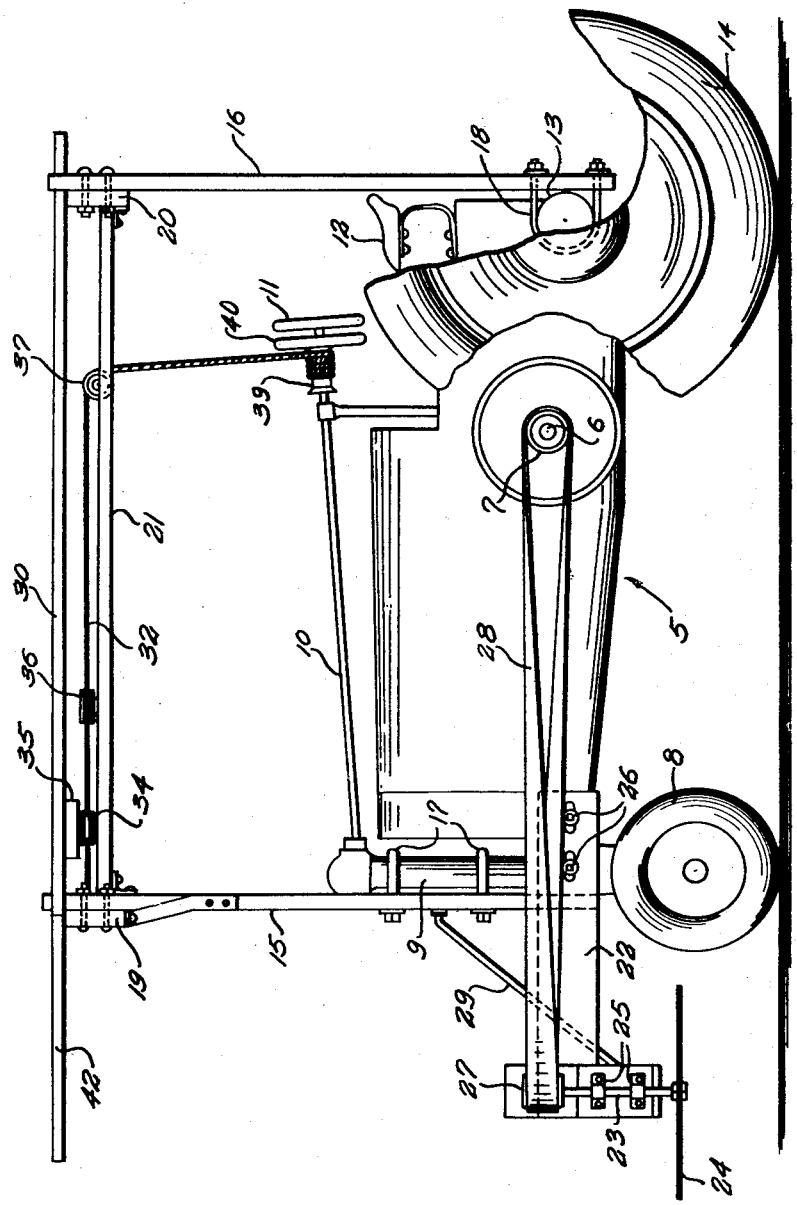
Figure 1 is a side elevational view of a tree felling machine embodying the present invention, partly broken away.
Figure 2:
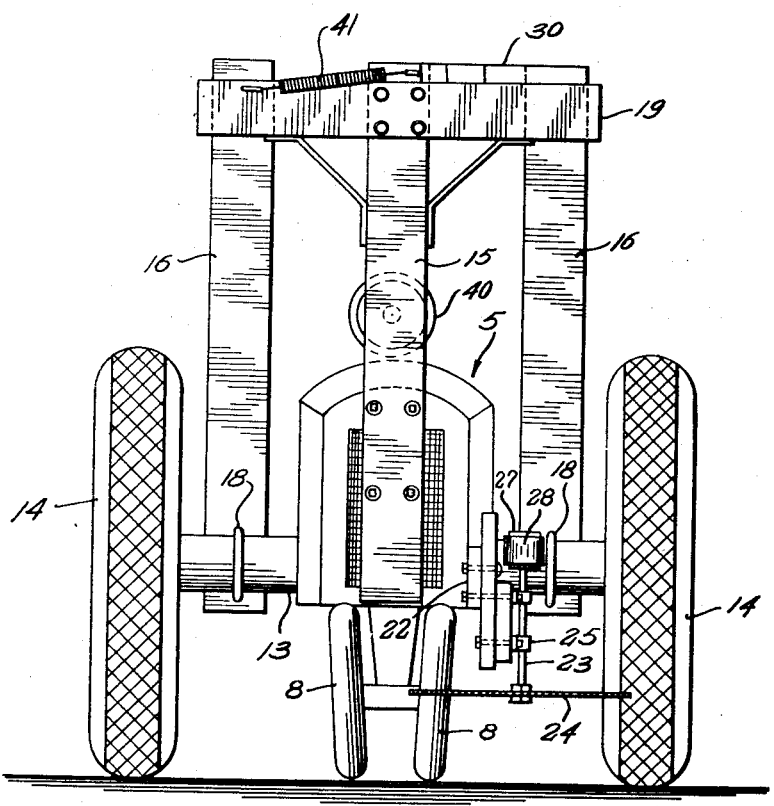
Figure 2 is a front elevational view thereof.

Referring in detail to the drawings, the illustrated embodiment of the invention includes a conventional agricultural tractor 5 provided with a laterally projecting power take-off shaft 6 equipped with a pulley 7. The tractor has the usual front steering and supporting wheels 8 mounted on the lower end of a steering shaft journaled within a steering column 9 and actuated by an operating shaft 10 geared to the upper end of the steering shaft within the top of the column 9 and equipped at its rear end with a steering handle or wheel 11 arranged within convenient reach from the driver's seat 12. The tractor further includes the usual rear axle housing 13 and rear driving and supporting wheels 14.

Mounted on the tractor is a rigid frame including an upright 15 and a pair of further uprights 16 rigidly mounted on and respectively projecting upwardly from the front and rear ends of the tractor. As shown, the front upright 15 is bolted by means of U-bolts 17 to the steering column 9, while the uprights 16 are secured to the rear axle housing 13 by U-bolts 18. The frame further includes a cross-piece 19 fixed to the upper end of the upright 15 and a cross-bar 20 rigidly connecting the upper ends of the uprights 16, the upright 15 and the cross-bar 20 being rigidly connected by a longitudinal brace-bar 21.

Fixed to and projecting forwardly from the front end of the tractor 5 at one side of the latter is a supporting arm 22 having the vertical shaft 23 of a horizontal circular saw 24 journaled on the forward end thereof in bearings 25. The arm 22 is secured to the frame of the tractor as at 26 for adjustment longitudinally of said tractor. Secured on the upper end of the shaft 23 is a pulley 27, and a twisted belt 28 passes around the pulley 7 of the power take-off shaft 6 and the pulley 27, so as to provide for driving the saw 24. The adjustment of arm 22 longitudinally of the tractor permits maintenance of the belt 28 in a taut condition. The arm 22 is braced by means of a forwardly inclined brace 29 extending between the forward end of said arm 22 and the vertical member or upright 15 of the frame.

Disposed upon the cross-piece 19 and cross-bar 20 is a lever 30, arranged near that side of the tractor at which the saw 24 is located. Lever 30 is pivoted at its rear end to the cross-bar 20 as at 31, and it extends across and forwardly beyond the cross-piece 19 to a point above the saw 24. Means is provided for swinging the lever 30 horizontally about its pivot 31 and toward that side of the tractor at which the power take-off shaft is located, whereby to swing the forward end portion of said lever 30 into engagement with a side of the tree being felled. This means preferably consists of a cable 32 attached at one end to the upright 15 as at 33 and passing from this point of attachment laterally around a guide pulley 34 carried by an arm 35 rigid with the forward portion of lever 30 and projecting from the latter in a direction away from the saw 24. From the pulley 34, the cable 32 extends inwardly about a guide pulley 36 carried by the bar 21. The cable 32 then extends rearwardly from pulley 30 over a pulley 37 carried by bar 21 and downwardly through a slot 38 provided in the latter. From pulley 37, cable 32 extends to and is attached to a winding drum 39 journaled on the operating shaft 10 and equipped with an actuating handle or wheel 40 located directly in front of the steering handle or wheel 11. It will thus be seen that the drum 39 may be operated manually from the driver's seat of the tractor for swinging the lever 30 into engagement with the tree being felled. The lever 30 is swung in the opposite direction or away from the tree by means of a helical tension spring 41 connecting the forward end of lever 30 with the end of cross-piece 19 which is remote to the saw 24. Movement of lever 30 away from the tree is limited by the upper end of upright 15 which is disposed in the path of said lever 30. It will be noted that the forward end portion of lever 30 has a beveled edge 42 at that side which is disposed to contact the tree being felled.

In operation, the machine is propelled forwardly until the saw 24 engages the trunk of the tree at the front and adjacent the outer side of the saw. The saw is then placed in operation and the machine is slowly propelled forwardly as the sawing operation proceeds. Before the saw has cut a great distance through the trunk of the tree, the lever 30 is swung into engagement with the inner side of the tree trunk. Thus, as the sawing operation proceeds, lever 30 will ultimately cause the tree to fall laterally of the tractor out of the path of the latter, such lateral falling of the tree being facilitated by lateral pressure exerted against the tree due to swinging of the lever 30 by manipulation of the drum 39. In this way, all danger of the tree falling onto the tractor and injuring the driver of the machine is avoided. After the tree has been felled, the machine may be readily propelled to a new location and employed for felling another tree. Of course, the lever 30 will be returned to its normal position against the upright 15 as soon as the wheel or handle 40 of the drum 39 is released, under the influence of the spring 41.

From the foregoing description, it is believed that the construction, operation and advantages of the present invention will be readily understood and appreciated by those skilled in the art. The invention is susceptible of modification and changes in details of construction, such as fall within the spirit and scope of the invention as claimed.

What I claim is:

1. A tree felling machine comprising a motor vehicle, a frame including uprights rigid with and projecting upwardly from the front and rear ends of the vehicle, a horizontal circular saw rigidly mounted on and located in front of the vehicle at one side of the latter, driving connections between the power plant of said motor vehicle and said saw, a horizontally swinging lever pivoted at its rear end to the rear of said frame, said lever being disposed longitudinally of and on top of the frame and having a free forward end portion projecting forwardly of the vehicle in position to swing laterally into engagement with the inner side of a tree being sawed by said saw at a point above the saw, and means to swing said lever in one direction into engagement with the tree so that the latter will be caused to fall laterally of and out of the path of the tractor when felled.

2. A tree felling machine comprising a motor vehicle, a frame including uprights rigid with and projecting upwardly from the front and rear ends of the vehicle, a horizontal circular saw rigidly mounted on and located in front of the vehicle at one side of the latter, driving connections between the power plant of said motor vehicle and said saw, a horizontally swinging lever pivoted at its rear end to the rear of said frame, said lever being disposed longitudinally of and on top of the frame and having a free forward end portion projecting forwardly of the vehicle in position to swing laterally into engagement with the inner side of a tree being sawed by said saw at a point above the saw, means to swing said lever in one direction into engagement with the tree so that the latter will be caused to fall laterally of and out of the path of the tractor when felled, yieldable means to swing the lever in the opposite direction to a position for engagement with the next tree to be felled, and means to limit swinging movement of the lever in the latter direction.

3. In combination with an agricultural tractor having a rear axle housing and a front steering column, a frame including an upright rigid with and projecting upwardly from the steering column, a pair of uprights rigid with and projecting upwardly from the rear axle housing, a bar connecting said uprights, and cross members carried by said uprights at the front and rear of the frame, a horizontal circular saw mounted on and located in front of the tractor at one side of the latter, said tractor further including a laterally extending power take-off shaft, driving connections between the power take-off shaft and the saw, a horizontally swinging lever pivotally mounted on top of the frame and having a forward end portion projecting forwardly of the tractor in position to swing into engagement with the inner side of the tree being sawed, and means manually operable from the driver's seat of the tractor to swing said lever into engagement with the tree for causing the latter to fall laterally of and out of the path of the tractor when felled.

GORDON KING.

REFERENCES CITED

The following references are of record in the file of this patent:

UNITED STATES PATENTS

| Number | Name | Date |
| --- | --- | --- |
| 1,318,324 | Keon | Oct. 7, 1919 |
| 1,414,319 | Zaiauskis | Apr. 25, 1922 |
| 2,354,625 | Van Sickle | July 25, 1944 |
| 2,404,655 | Randall | July 23, 1946 |

FOREIGN PATENTS

| Number | Country | Date |
| --- | --- | --- |
| 324,506 | France | Dec. 13, 1902 |